United States Patent
Usami

[19]

[11] Patent Number: 5,608,549
[45] Date of Patent: Mar. 4, 1997

[54] APPARATUS AND METHOD FOR PROCESSING A COLOR IMAGE

[75] Inventor: Akihiro Usami, Yokohama, Japan

[73] Assignee: Canon Kabushiki Kaisha, Tokyo, Japan

[21] Appl. No.: 895,622

[22] Filed: Jun. 9, 1992

[30] Foreign Application Priority Data

Jun. 11, 1991 [JP] Japan ................................. 3-139089
Oct. 24, 1991 [JP] Japan ................................. 3-277568

[51] Int. Cl.⁶ ................................................ G06T 1/00
[52] U.S. Cl. .......................... 358/530; 358/502; 358/518; 358/523
[58] Field of Search ..................... 358/500, 501, 358/502, 503, 518, 520, 523, 530, 537

[56] References Cited

U.S. PATENT DOCUMENTS

| | | |
|---|---|---|
| 3,689,689 | 9/1972 | Weitzsch . |
| 4,500,919 | 2/1985 | Schreiber . |
| 4,719,503 | 1/1988 | Craver et al. . |
| 4,803,548 | 2/1989 | Kirk . |
| 4,929,978 | 5/1990 | Kanamori et al. . |
| 4,959,711 | 9/1990 | Hung et al. . |
| 4,959,790 | 9/1990 | Morgan ................................. 364/518 |
| 5,057,913 | 10/1991 | Nagata et al. . |
| 5,146,328 | 9/1992 | Yamasaki et al. . |
| 5,233,413 | 8/1993 | Fuchsberger . |
| 5,237,400 | 8/1993 | Washio et al. . |

*Primary Examiner*—Bentsu Ro
*Attorney, Agent, or Firm*—Fitzpatrick, Cella, Harper & Scinto

[57] ABSTRACT

A color image processing apparatus in which input first image data is color corrected based on a color correction parameter and color corrected second image data is output. A storage device stores a plurality of combinations of third image data of the same data format as the second image data, and fourth image data representing an image to be reproduced based on the third image data. The color correction parameter is produced based on the third image data and the fourth image data stored in the storage device.

33 Claims, 16 Drawing Sheets

FIG. 2

| COLOR SIGNAL / PATCH NO. | 1 | 2 | 3 | 4 | 5 | 6 | ... | 79 | 80 | 81 |
|---|---|---|---|---|---|---|---|---|---|---|
| Y | 0 | 128 | 255 | 0 | 128 | 255 | | 0 | 128 | 255 |
| M | 0 | 0 | 0 | 128 | 128 | 128 | | 255 | 255 | 255 |
| C | 0 | 0 | 0 | 0 | 0 | 0 | | 255 | 255 | 255 |
| Bk | 0 | 0 | 0 | 0 | 0 | 0 | | 255 | 255 | 255 |
| CHROMATICITY | | | | | | | | | | |
| L* | 80.0 | 75.0 | 70.0 | 70.0 | 65.0 | 60.0 | | 22.0 | 21.0 | 20.0 |
| a* | 1.0 | 0.0 | -2.0 | 20.0 | 20.0 | 20.0 | | 0.0 | 0.5 | 1.0 |
| b* | 2.0 | 30.0 | 70.0 | -25.0 | 20.0 | 50.0 | | -2.0 | -1.0 | 0.0 |

_5,608,549_

APPARATUS AND METHOD FOR PROCESSING A COLOR IMAGE

BACKGROUND OF THE INVENTION

1. Field of the Invention

The present invention relates to an apparatus for processing a color image and, more particularly, to an apparatus and method for inputting an image of a plurality of color data items, such as four color data items, yellow (Y), magenta (M), cyan (C) and black (Bk).

2. Description of the Related Art

Conventional image processing apparatuses for inputting and outputting Y, M, C and Bk data items perform no calculations or only predetermined calculations.

An automatic setting method referred to as automasking is utilized to set color correction conditions.

The above known arrangements have a disadvantage in that when yellow, magenta, cyan and black image signals (hereinafter referred to as YMCBk signals) used for one type of output printer are fed to another type of output printer so as to print an image, the color of an image output by the former printer differs from the color of an image output by the latter printer. It is impossible to determine color processing parameters when the YMCBk signals are employed. When there is a difference in color reproducibility between one output device and another, colors cannot be corrected by using the YMCBk signals. For example, as shown in FIG. 4, when YMCBk signals used for printer A are output by printer B, the color of a copy produced by the former printer differs from that of a copy produced by the latter printer.

In addition, in conventional printers, when four color data items, e.g., yellow, magenta, cyan and black, are superposed on each other on the same pixel, the toner and ink may be scattered, thus deteriorating image quality or decreasing a fixing capacity.

There are color image processing apparatuses which convert YMCBk or YMC signals into luminance signals, such as red, green and blue. Such image processing apparatuses perform no calculations or only predetermined calculations with respect to the YMCBk signals.

There have been occasions when YMCBk signals used for a certain output device are input, red, green and blue luminance signals must be output.

SUMMARY OF THE INVENTION

An object of the present invention is to provide an image processing apparatus and method which solve the above-mentioned problems.

Another object of this invention is to provide an image processing apparatus and method which prevent image quality from deteriorating due to a recording colorant being blurred or scattered.

A further object of the invention is to provide an image processing apparatus capable of satisfactorily converting given density signals into luminance signals.

Yet another object is to provide an image processing apparatus having a novel function.

According to one aspect of the present invention, a color image processing apparatus is provided for reproducing an image of a plurality of color data items in accordance with the input of the image. This apparatus comprises means for inputting a combination value of the plurality of color data items and a chromaticity value corresponding to the combination value, and means for setting the conditions under which color correcting means corrects color in accordance with the input of the inputting means.

According to another aspect of the invention, a method of processing a color image is provided in which the conditions under which a converting means converts given color image data items into other color image data items for reproducing purposes are automatically set so that the degree to which the color image data items are mixed together becomes a predetermined value or less.

Other objects, features and advantages of this invention will become more fully apparent from the following detailed description of the preferred embodiments taken in connection with the accompanying drawings.

BRIEF DESCRIPTION OF THE DRAWINGS

FIG. 2 is a table showing color signals and chromaticity values used in the first embodiment;

DESCRIPTION OF THE PREFERRED EMBODIMENTS

Figure 1:
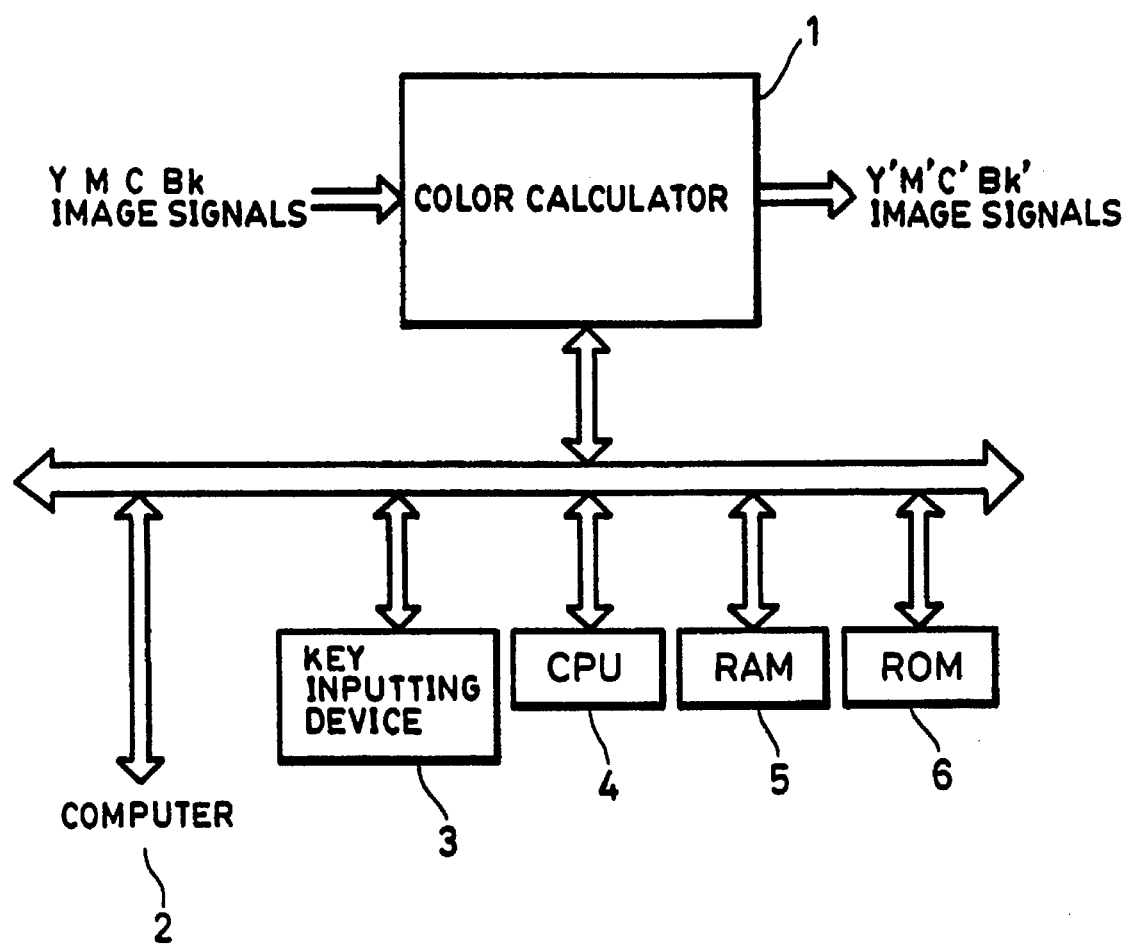
FIG. 1 is a block diagram showing the circuitry of a first embodiment of the present invention.

FIG. 1 is a block diagram showing the circuitry of a first embodiment of the present invention. Yellow (Y), magenta (M), cyan (C) and black (Bk) image signals (hereinafter referred to as YMCBk signals) are input from, for example, a computer, and are calculated by a color calculator 1. Y', M', C' and Bk' image signals (hereinafter called Y'M'C'Bk' signals) are determined and output to a printer or the like. The color calculator 1 performs processes, such as masking, inking and UCR, and another process using a LUT, such as direct mapping. In this embodiment, only masking will be described.

When 4×4 masking is performed, the following equation (1) is performed:

$$\begin{bmatrix} Y' \\ M' \\ C' \\ Bk' \end{bmatrix} = \begin{bmatrix} m_{1,1} & m_{1,2} & m_{1,3} & m_{1,4} \\ m_{2,1} & m_{2,2} & m_{2,3} & m_{2,4} \\ m_{3,1} & m_{3,2} & m_{3,3} & m_{3,4} \\ m_{4,1} & m_{4,2} & m_{4,3} & m_{4,4} \end{bmatrix} \begin{bmatrix} Y \\ M \\ C \\ Bk \end{bmatrix} \quad (1)$$

Parameters starting from $m_{1,1}$ to $m_{4,4}$ must be determined and set beforehand in order for the color calculator 1 to perform equation (1).

Figure 5:
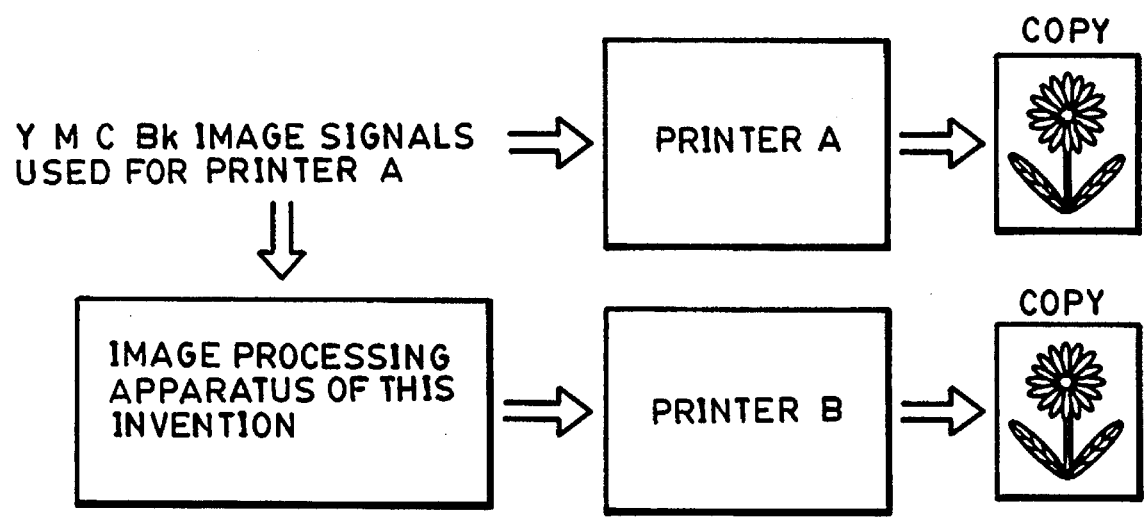
FIG. 5 is a view showing the concept of the first embodiment of the invention.

To this end, the characteristics of a printer used for inputting the YMCBk signals and the characteristics of a printer used for outputting the Y'M'C'Bk' signals must be determined. The characteristics of printers A and B are determined using the concept of this embodiment shown in FIG. 5 as an example.

Figure 3:
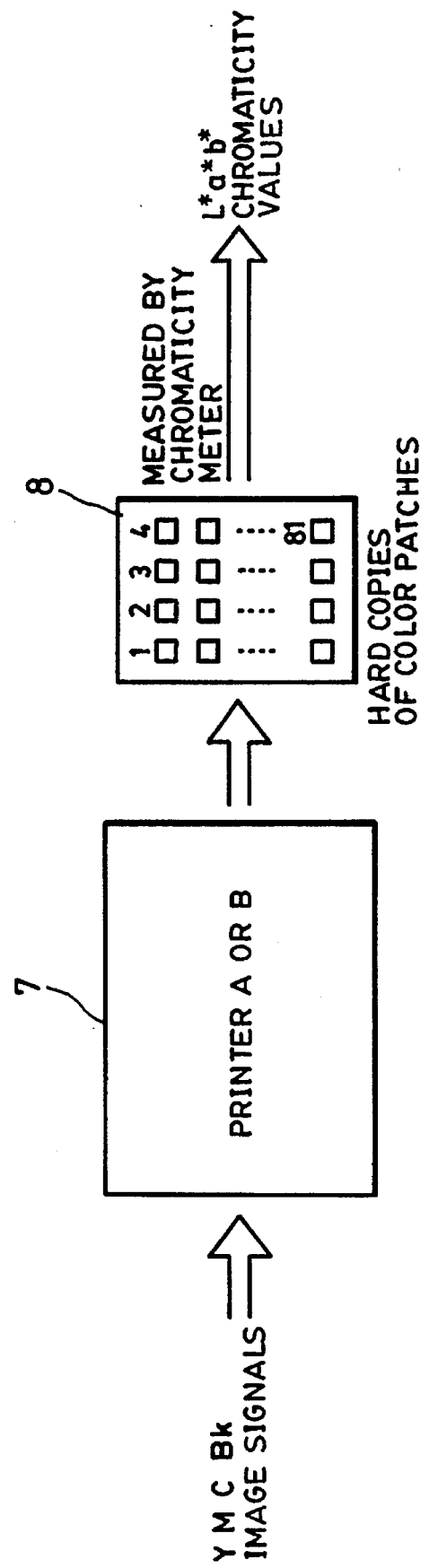
FIG. 3 is a view illustrating the method of determining the chromaticity values used in the first embodiment.

The user previously produces hard copies of color patches using printer A or B shown in FIG. 3, measures chromaticity values of the color patches using a chromaticity meter, and makes the table shown in FIG. 2. In FIG. 2, the YMCBk signals are combined at 3 levels 0, 128 and 255, thus forming 81 color patches (3×3×3×3=81). A printer 7 shown in FIG. 3 produces hard copies so that the 81 color patches are formed. The chromaticity values of the color patches are determined by the chromaticity meter. Chromaticity values L*, a* and b* are used in FIG. 2.

Figure 6:
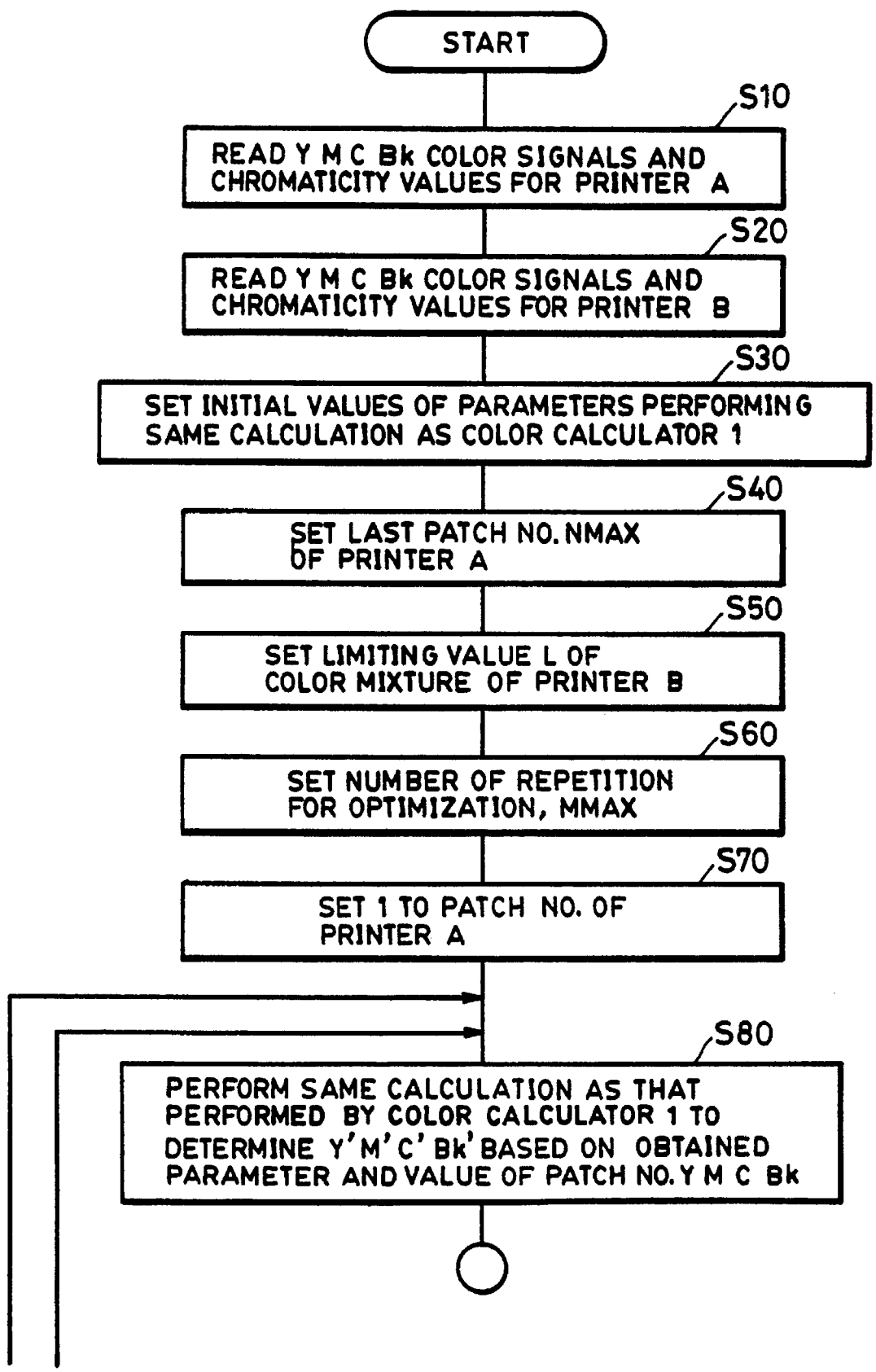
FIGS. 6 and 7 are flowcharts showing the operation of the first embodiment of the invention.
Figure 7:
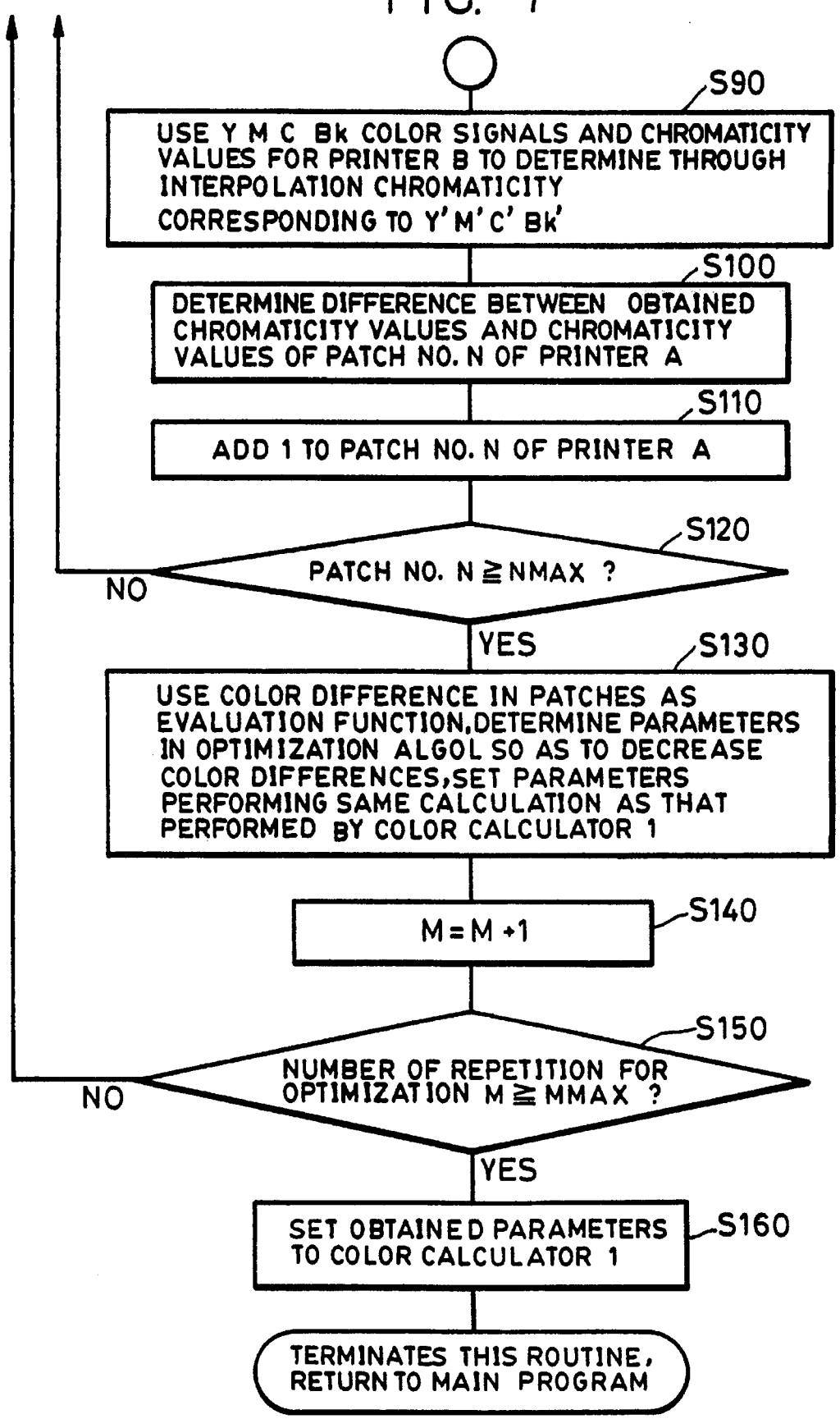

FIGS. 6 and 7 are flowcharts showing the operation of the first embodiment of the invention. A CPU 4 operates as shown in the flowcharts. In order for the CPU 4 to operate in accordance with the flowcharts, programs are written beforehand in a ROM 6. The operation of the CPU 4 will be described with reference to FIGS. 6 and 7. In step S10, YMCBk signals and chromaticity values for printer A are read. The user inputs these data items by a computer 2 or a key input device 3 shown in FIG. 1. The data items are saved in a RAM 5. In step S20, YMCBk signals and chromaticity values for printer B are read. The user also inputs these data items by the computer 2 or the key input device 3 shown in FIG. 1. The data items are saved in the RAM 5. In step S30, parameters are set which perform the same calculation as that performed by the color calculator 1. In this case, the initial values of parameters starting from $m_{1,1}$ to $m_{4,4}$ are set.

In step S40, the last patch number of printer A, NMAX, is set. In this embodiment, 81 patches are utilized, and thus the NMAX is 81.

In step S50, the limiting value of a color mixture for an output printer is set. If the values of the YMCBk signals are output to the fullest extent (255 in the case of 8 bits) by a four-color printer, the ink may be blurred and the toner scattered, thus deteriorating the image quality. To avoid such a problem, it is required to have a value which limits the range within which colors are mixed. If the limiting value is expressed as L, it is set so that $L \geq (Y+M+C+Bk)/255$, in which Y, M, C and Bk indicate the data values of yellow, magenta, cyan and black, respectively. The limiting value L may appropriately vary according to the type of printer, and is usually 3. The parameters used for the color calculator 1 are determined so as to be not more than the limiting value L.

In step S60, the number of repetitions for optimization, MMAX, is set.

In step S70, one (1) is set as the initial value of the patch number, N.

When the patch number is N, the values of the YMCBk signals are retrieved from the RAM 5. In step S80, the CPU 4 performs a masking calculation in accordance with equation (1) to determine the Y'M'C'Bk' signals.

In step S90, the CPU 4 utilizes the YMCBk signals and chromaticity values for printer B to determine through interpolation chromaticity values corresponding to Y'M'C'Bk' signals. This determination can be made easily through, for example, linear interpolation.

The color difference between the above-determined chromaticity values and the chromaticity value of the patch number N for printer A is determined in step S100.

In step S110, one (1) is added to the patch number N (S110). In step S120, the above routine starting from step S80 to S110 is repeated until the patch number N becomes 81.

In step S130, the obtained color difference between the patches is used as an evaluation function. Then 16 marking parameters are determined in an optimization algol so as to minimize the color difference. This operation is repeated a predetermined number of times. A target color difference may be set beforehand. If the obtained color difference is smaller than the target color difference and the limiting value of a color mixture for the output printer, then the above routine is terminated.

The steepest descent method, the least square method, the attenuation least square method and the orthogonalization method are known optimization methods. Any of these methods may be employed. The least square method will be described below by way of example.

An evaluation function (corresponding to a color value) $f_i$, a variable (corresponding to a masking parameter) x, and an evaluation function and a variable with 0 are used as an initial value (starting point). Only values approximate to $f_i = f_{i0} + \Sigma a_{ij}(x_j - x_{j0})$ are calculated.

$a_{ij} = \partial f_i / \partial x_j = \Delta f_{ij} / \Delta x_j$

However, $\Delta f_{ij} = f_i(x_{10}, \text{———}, x_{j-10}, x_{j0} + \Delta x_j, x_{j+10}, \text{———} x_{n0}) - f_{i0}$,
and $x_j = x_j - x_{j0}$ where "n" represents 16 masking parameters.

$$X = \begin{bmatrix} x_1 \\ x_2 \\ \cdot \\ \cdot \\ \cdot \\ x_n \end{bmatrix} \quad f = \begin{bmatrix} f_1 \\ f_2 \\ \cdot \\ \cdot \\ \cdot \\ f_m \end{bmatrix}$$

In this case, "m" is a number obtained by adding the limiting value of a color mixture for the output printer to 243, which is obtained by multiplying 3 chromaticity values by 81 patches. In this case the parameter is single, and therefore "m" equals 244.

When $$A = \begin{bmatrix} a_{11} & \cdots & a_{1n} \\ \cdot & & \\ \cdot & & \\ \cdot & \cdots & \cdots \\ \cdot & & \\ \cdot & & \\ a_{m1} & \cdots & a_{mn} \end{bmatrix}$$

and if a solution is close to the starting point, the following equation can be obtained:

$$\Delta X = -(f_0 - f_t)$$

where $f_t$ is a target value.
A single evaluation scale $\phi$ is expressed as follows:

$$\phi = \Sigma w_i^2 (f_i - f_{it})^2$$

where $w_i$ is a weight.

$$G = 1/2 \, grad\phi = 1/2 \begin{bmatrix} \partial\phi/\partial x_1 \\ \partial\phi/\partial x_n \end{bmatrix}$$

$$= A^t (f - f_t)$$

where $w_i f_i = f_i$ $$\phi = (f - f_t)^T (f - f_t)$$
$$= \|f - f_t\|^2$$

where "T" represents a transposition.
When a solution X which makes grad$\phi$=0 is determined, because $$A^T (f - f_t) = A^T (AX + f_0 - f_t) = 0, \text{ and}$$

$$X = -(A^T A)^{-1} A^T (f_0 - f_t),$$

the initial value is updated using the solution X. The above-described operation is repeatedly performed to determine the masking parameters. As mentioned above, there are various optimization methods, and any appropriate optimization method may be employed.

In step S160, the thus-obtained 16 parameters are set in the color calculator 1.

When the YMCBk signals are input to the color calculator 1, these signals are color-processed in accordance with the set parameters to output the Y'M'C'Bk' signals.

Another Embodiment

Figure 8:
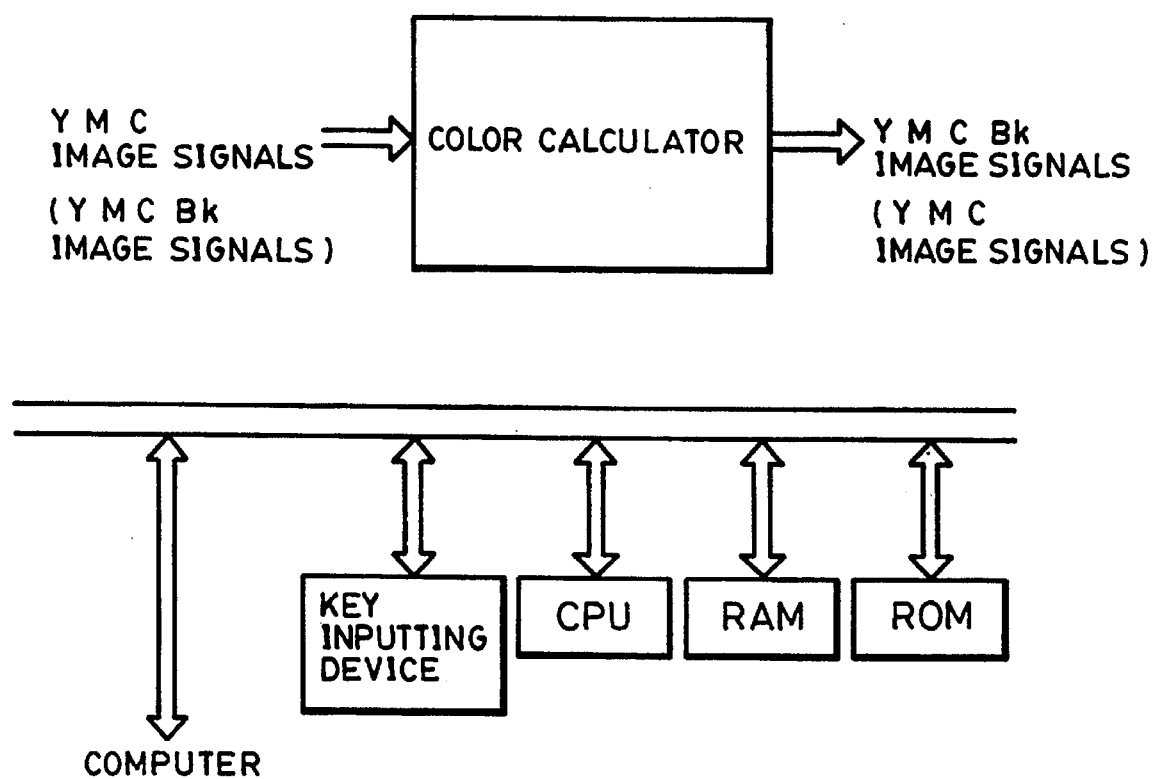
FIG. 8 is a block diagram showing the circuitry of a second embodiment of the invention.

In the above-described embodiment of this invention, the four color signals, yellow (Y), magenta (M), cyan (C) and black (B), are input and output. However, only three color signals, yellow, magenta and cyan, may be input, depending upon the printer. As shown in FIG. 8, it is possible to input YMC signals and output YMCBk signals. In such a case, combinations of the YMC signals and their chromaticity values are used as the characteristics of an input printer.

It is also possible to input YMCBk signals and output YMC signals, and to both input and output YMC signals.

Also, inputting of YMC or YMCBk signals and outputting of YMC or YMCBk signals may be combined together.

In FIG. 2, the YMCBk signals are combined at 3 levels, totaling 81 types, in addition, these signals may be combined at, for example, 4 levels, thus totaling 256 types; 5 levels, thus totaling 625 types; or more levels.

In FIG. 2, signal values are determined by including 0 and 255, however, these values may also be determined by interpolation, such as extrapolation, without including 0 or 255.

In FIG. 2, although each of the YMCBk signals is composed of 8 bits, they may also be composed of a different number of bits.

Although L* a* and b* are used as chromaticity values in FIG. 2, other values, such as x, y and Y; L*, u* and v*; u, v and Y; or the density values of a densitometer, may also be used as chromaticity values.

Parameters used for the color calculator 1 shown in FIG. 1 can be changed. The color calculator 1 may perform any color processes as long as the values of the output color signals can be varied by changing the parameters. Thus, the color calculator 1 may perform UCR including the parameters, skeleton black, and high-order masking, or it may perform a process in which these processes and direct mapping are combined.

Figure 9:
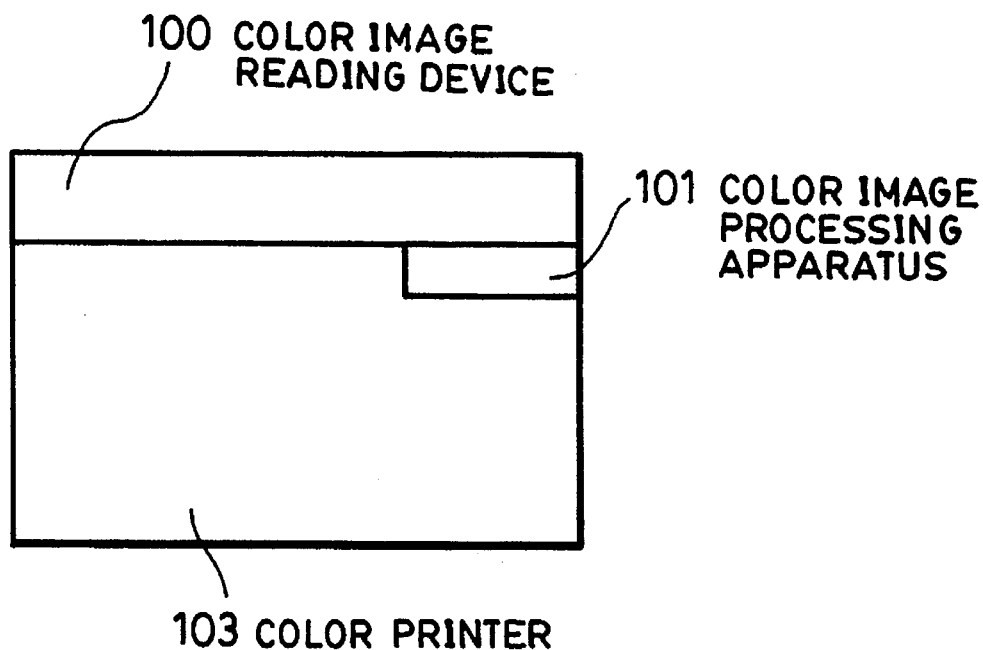
FIG. 9 is a view showing a third embodiment of the invention.
Figure 10:
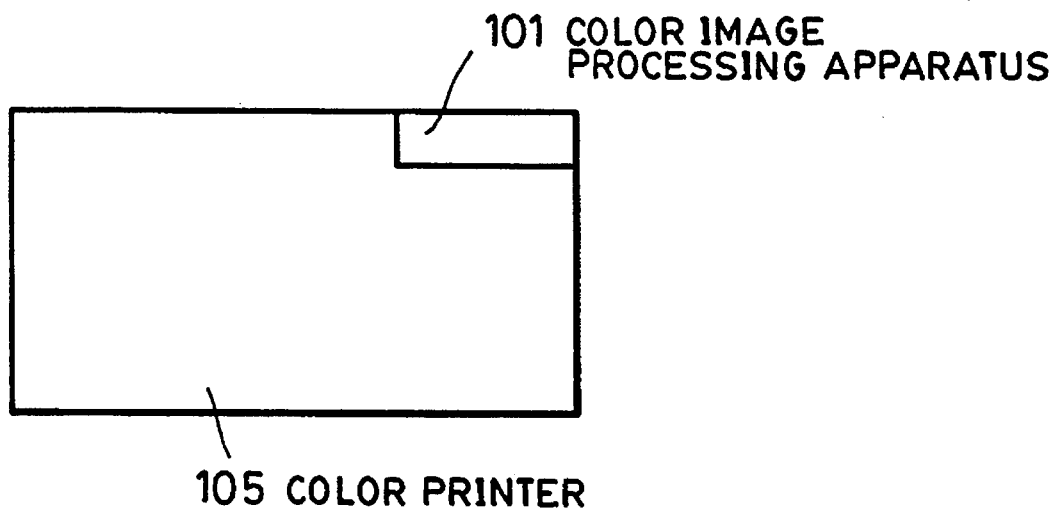
FIG. 10 is a view showing a fourth embodiment of the invention.

As shown in FIG. 9, a color image processing apparatus 101 illustrated in FIG. 1 may be incorporated into a color copying machine composed of a reading device 100 and a color printer 103. The structure of the above-mentioned embodiment may be incorporated into the color copying machine. As shown in FIG. 10, it is also possible to incorporate the color image processing apparatus 101 into another color printer 105. In such a case, since an output printer is already determined, chromaticity values and the YMC or the YMCBk signals, which are characteristics of the output printer, can be stored in the ROM 6 shown in FIG. 1. Only when the above characteristics of the printer are changed, can other characteristics of the output printer be input from the outside.

The initial values of parameters used for printers are stored beforehand in the ROM 6. These values are loaded from the ROM 6 into the color calculator 1 shown in FIG. 1 when the user selects the type of printer, and therefore the user is not required to input the characteristics of the printers.

Data stored in the RAM 5 and parameters calculated by the CPU 4 shown in FIG. 1 may be backed up.

As has been described above, this embodiment provides means for inputting color characteristics of two types of printers, and means for determining parameters on the basis of these characteristics. It is therefore possible to convert YMCBk signals used for one printer into signals used for another printer without deteriorating color reproducibility.

According to this embodiment, since a limiting value of a color mixture is set in a printer, and since a color correction coefficient is automatically set so as not to exceed the limiting value, it is possible to prevent image quality from deteriorating due to the ink and toner being scattered.

Another embodiment of this invention will now be described in detail. In this embodiment, a device is disclosed for converting YMCBk signals into red (R), blue (B) and green (G) luminance signals (hereinafter referred to as RBG signals).

Figure 11:
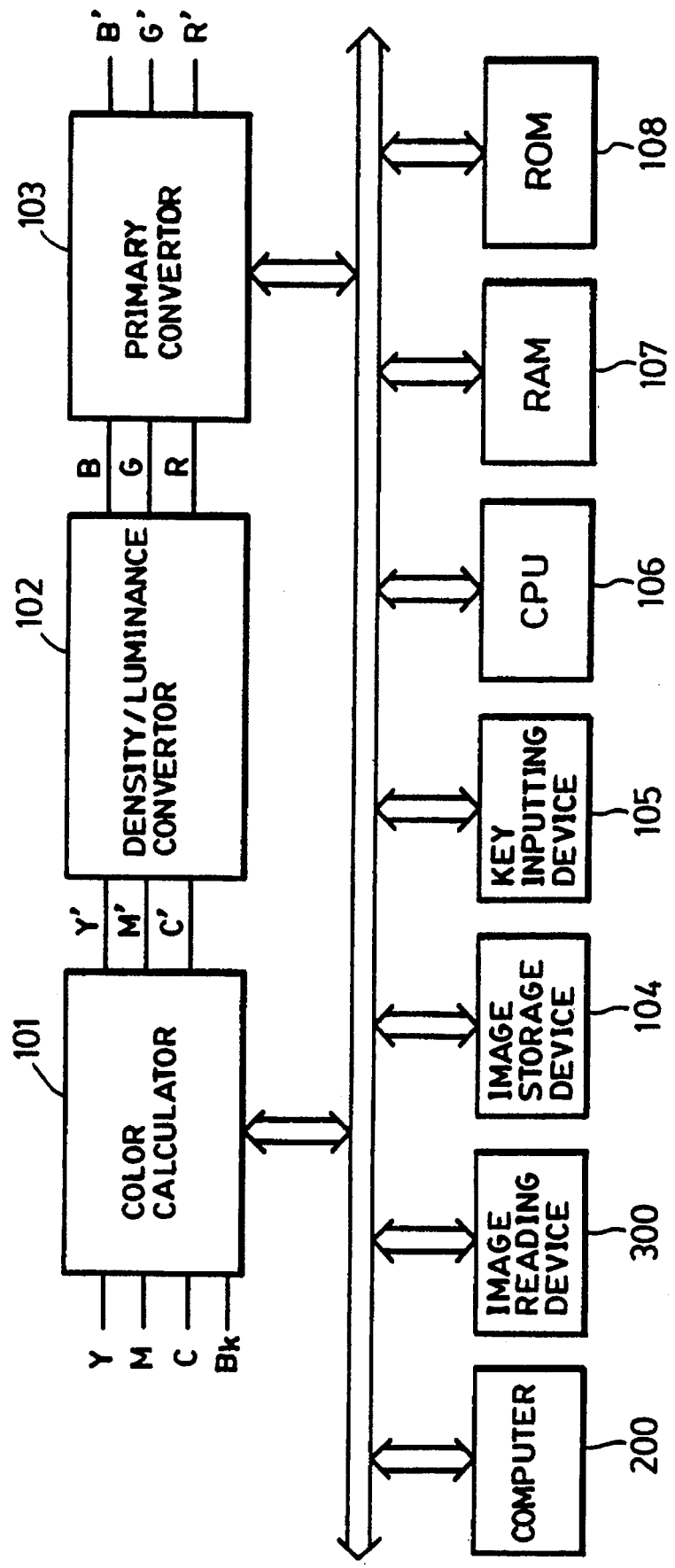
FIG. 11 is a block diagram showing a fifth embodiment of a color image processing apparatus according to the invention.
Figure 12:
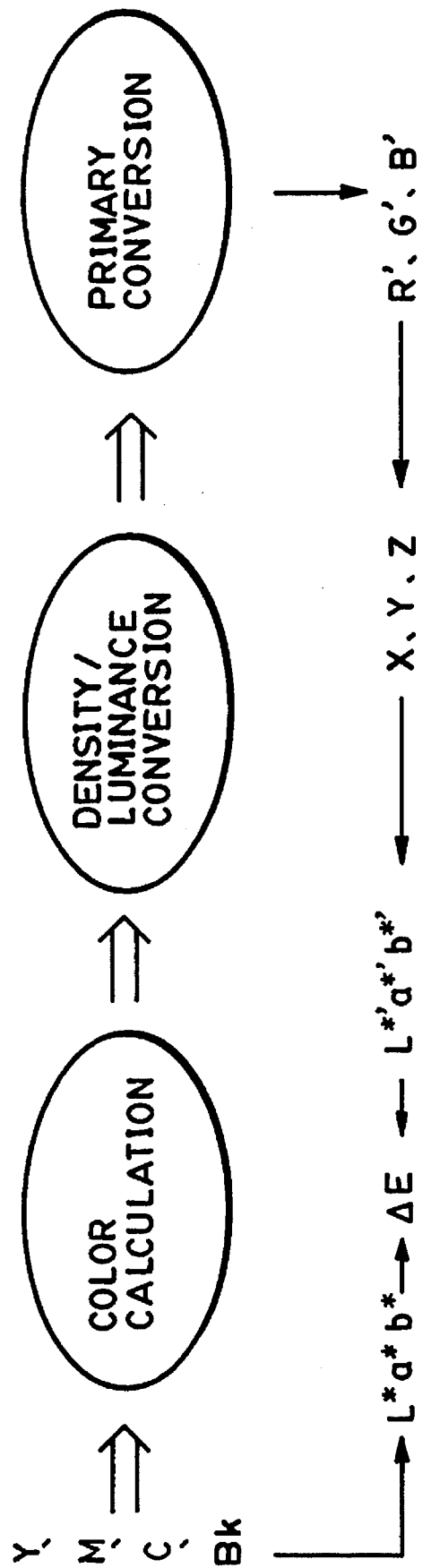
FIG. 12 is a view illustrating the method of determining chromaticity values used in the fifth embodiment.

FIG. 11 is a block diagram showing another embodiment of a color image processing apparatus. In FIG. 11, numeral 101 denotes a color calculator; 102, a density/luminance convertor; 103, a primary convertor; 104, an image storage device; 105, a key input device; 106, a CPU for controlling the entire color image processing apparatus; 107, a RAM serving as work areas for various programs; and 108, a ROM for storing programs and the like for operating the CPU 106 in accordance with the flowchart shown in FIGS. 13 and 14, described later. A computer 200 and an image reading device 300 are devices separate from the color image processing apparatus. Four image signals, such as yellow (Y), magenta (M), cyan (C) and black (Bk), are input to the color calculator 101.

In the color image processing apparatus, the YMCBk signals are input from, for example, the computer 200, and calculated by the color calculator 101 which determines Y'M'C' signals to be output. The density/luminance convertor 102 (inverse conversion of LOG) determines the three RGB luminance signals. The primary convertor 103 converts the RGB signals into R'G'B' signals. The calculating parameters used for the density/luminance convertor 102 and the primary convertor 103 are determined beforehand. However, since the parameters used for the color calculator 101 depend upon the color characteristics of a printer, these characteristics must be determined.

The color calculator 101 performs, for example, 3×4 calculation in accordance with the following equation (101):

$$\begin{bmatrix} Y' \\ M' \\ C' \end{bmatrix} = \begin{bmatrix} m_{1,1} & m_{1,2} & m_{1,3} & m_{1,4} \\ m_{2,1} & m_{2,2} & m_{2,3} & m_{2,4} \\ m_{3,1} & m_{3,2} & m_{3,3} & m_{3,4} \end{bmatrix} \begin{bmatrix} Y \\ M \\ C \\ Bk \end{bmatrix} \quad (101)$$

Parameters starting from $m_{1,1}$ to $m_{3,4}$ must be determined and set in order for the color calculator 101 to perform the above equation (101).

To this end, the color characteristics of a printer used for inputting the YMCBk signals must be determined. The relationship between the YMCBk signals and chromaticity values L*, a* and b* is determined in the same manner as in FIGS. 2 and 3.

Figure 4:
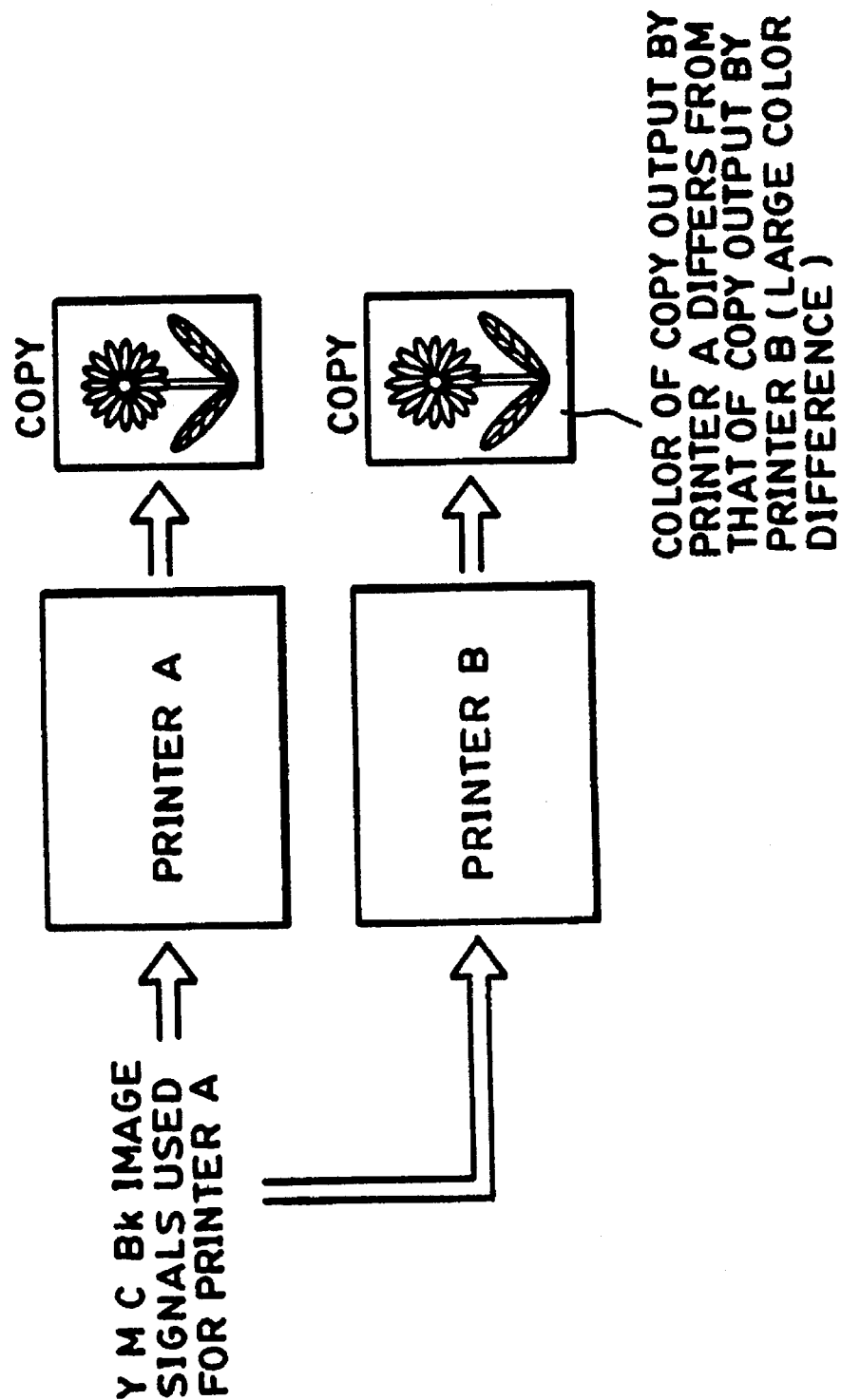
FIG. 4 is a view showing the known conventional image processing apparatus.

The user previously uses the printer to produce hard copies on the basis of the YMCBk signals, and measures the chromaticity values of the copies, L*, a* and b*, as shown in FIG. 4. These operations are performed in the same way as in FIGS. 2 and 3.

Figure 13:
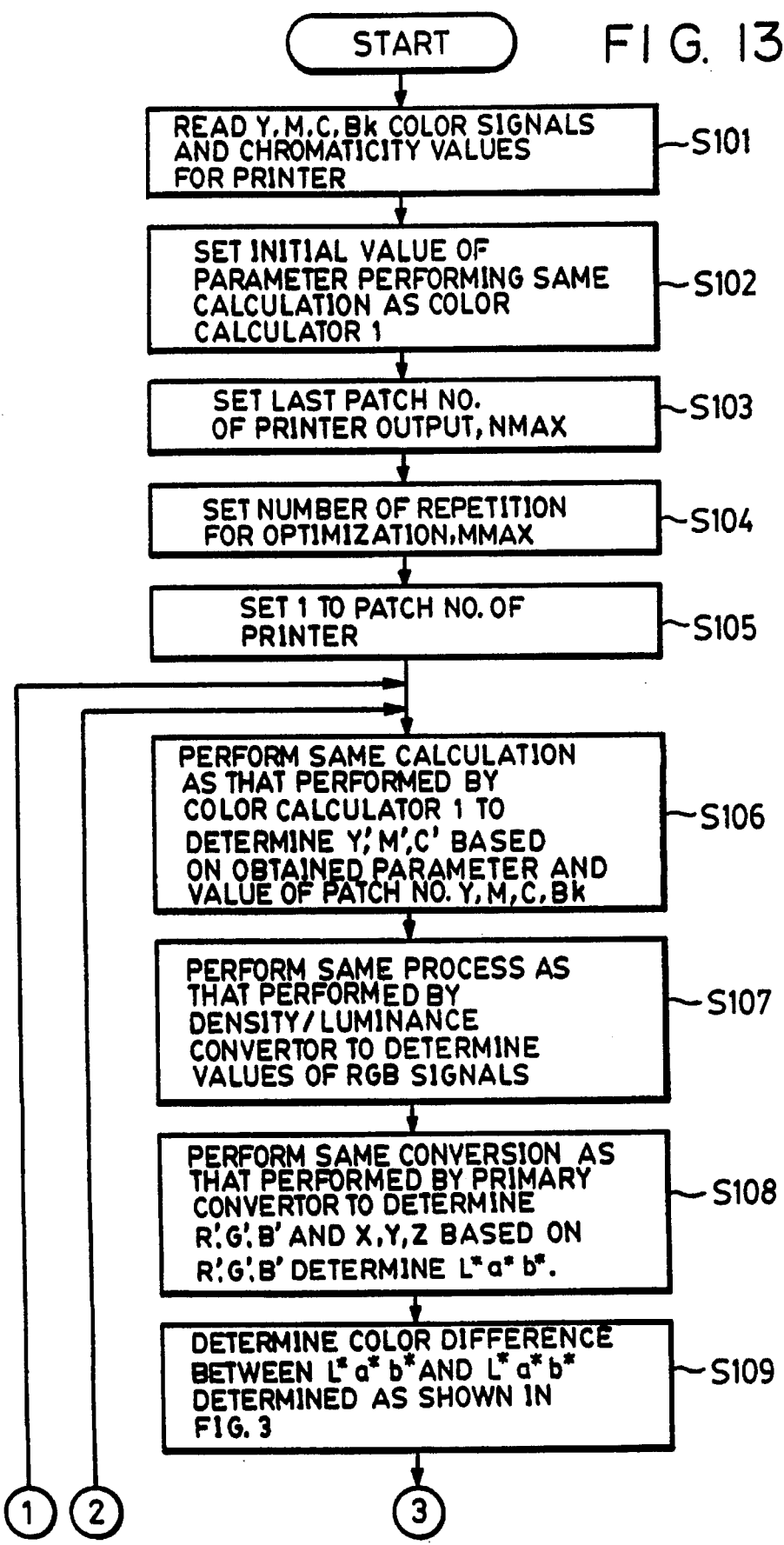
FIGS. 13 and 14 are flowcharts illustrating the operation of a CPU shown in FIG. 11.
Figure 14:
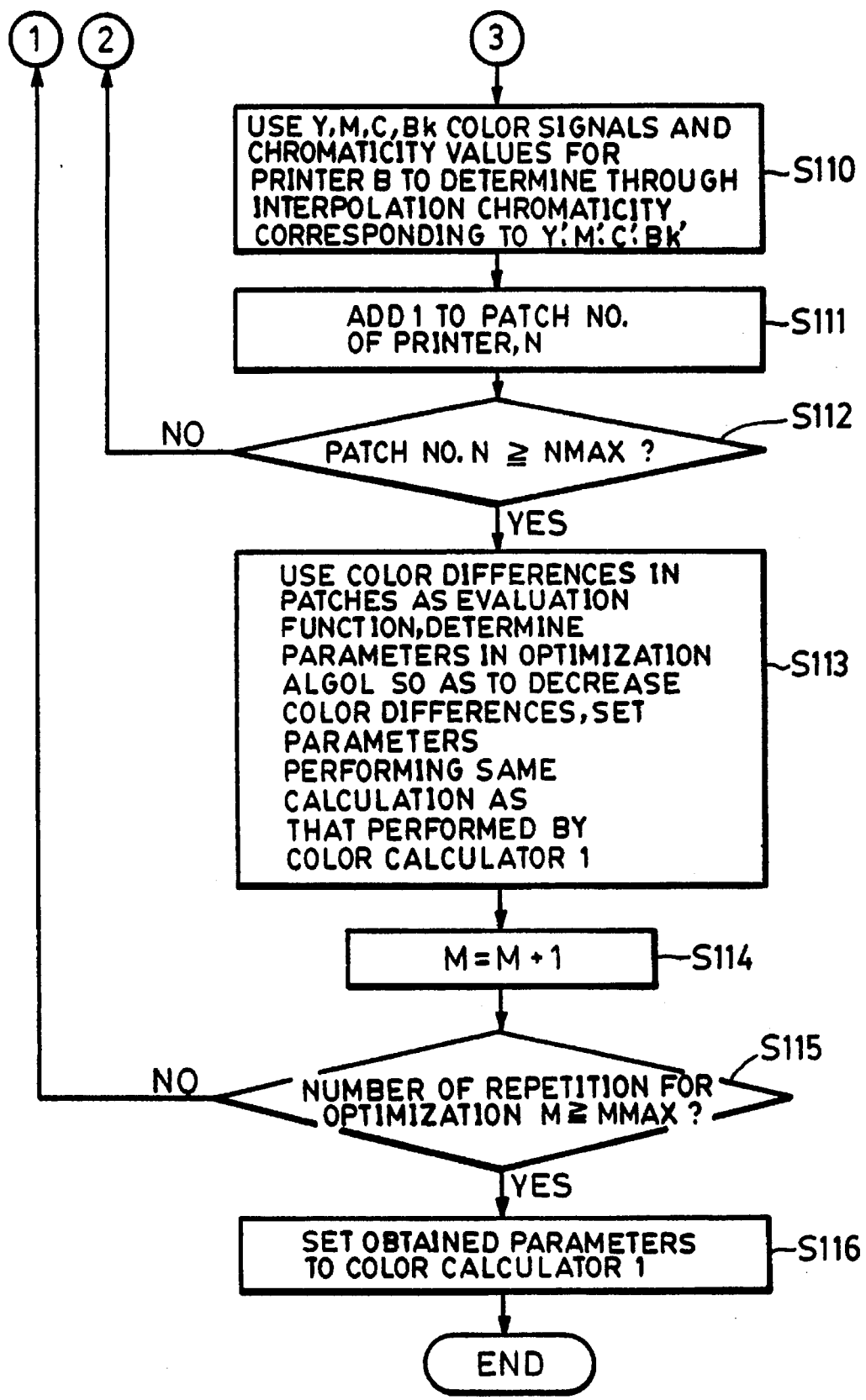

FIGS. 13 and 14 are flowcharts illustrating the operation of the CPU 106.

In steps 101, the YMCBk signals and chromaticity values for the printer are read in accordance with the table shown in FIG. 2. The user may input these data items through the key input device 105 shown in FIG. 11, or the image reading device 300 may be used in place of a chromaticity meter to read the patterns of the hard copies shown in FIG. 3. The data items are saved in the image storage device 104 shown in FIG. 11. The CPU 106 determines the chromaticity values of patches through a calculation.

The data which has been input or calculated is saved in the RAM 107.

In step S102, parameters are set which perform the same calculation as that performed by the color calculator 101. In this case, the initial values of the parameters starting from $m_{1,1}$ to $m_{3,4}$ are set. In step S103, the last patch number of the printer, NMAX, is set. In this embodiment, the NMAX is 81.

In step S104, the number of repetitions for optimization, MMAX, is set. In step S105, one (1) is set as the initial value of the patch number, N.

In step S106, the values of the YMCBk signals are retrieved from the RAM 107 when the patch number is N. The CPU 106 performs a calculation in accordance with equation (101) mentioned above to determine the Y'M'C' signals. In step S107, the same process as that performed by the density/luminance convertor 102 is performed to determine the values of the RGB signals based on the Y'M'C' signals. The density/luminance convertor 102 performs the following equation (102):

$$R = 255 * 10^{-(D*C/255)}$$

$$G = 255 * 10^{-(D*M/255)} \quad (102)$$

$$B = 255 * 10^{-(D*Y/255)}$$

where D is a difference between the maximum and minimum densities, and is a value usually ranging from 1.5 to 2.0.

In step S108, the same process as that performed by the primary convertor 103 is carried out to determine R'G'B' signals based on the RGB signals, which are determined by equation (102). In step S109, excitation values X, Y and Z conforming to the International Commission on Illumination (CIE) are determined on the basis of the R'G'B' signals determined in step S108. If the R'G'B' signals are RGB signals conforming to the National Television System Committee (NTSC), conversion is performed as the following equation (103):

$$\begin{bmatrix} X \\ Y \\ Z \end{bmatrix} = \begin{bmatrix} 0.6067 & 0.1736 & 0.2001 \\ 0.2988 & 0.5868 & 0.1144 \\ 0. & 0.0661 & 1.1150 \end{bmatrix} \begin{bmatrix} R' \\ G' \\ B' \end{bmatrix} \quad (103)$$

In step S109, chromaticity values L*', a*' and b*' are determined on the basis of the excitation values X, Y and Z. First, the excitation values X, Y and Z are corrected on the basis of the conditions under which an observation light source, the maximum value of the RGB signals and white paper are read. Then, these values are converted into chromaticity values.

In step S110, the CPU 106 utilizes the relationship between chromaticity values and the YMCBk signals for the printer, both saved in the RAM 107. The CPU 106 then determine through a calculation a color difference between the chromaticity values L*, a* and b* used for the printer and the other chromaticity values L*', a*' and b*' obtained above. The color difference is defined as the following equation (104):

$$\text{Color difference} = \{(L^* - L^{*'})^2 + (a^* - a^{*'})^2 + (b - b^{*'})^2\}^{1/2} \quad (104)$$

In step S111, one (1) is added to the patch number N. In step S112, the above routine starting from step S106 to S111 is repeated until the patch number N becomes 81.

In step S113, a color difference between patches is used as an evaluation function to determine 12 masking parameters in an optimization algol so that the color difference is minimized. In step S114, one (1) is added to the optimization number M. In step S115 the above routine starting from step S106 to S114 is repeatedly performed a predetermined number of times (MMAX times). Of course, a target color difference may be set beforehand, and if the color difference is smaller than the target color difference, the above routine is terminated.

The steepest descent method, the least square method, the attenuation least square method and the orthogonalization method are known optimization methods. The least square method will be described below by way of example.

An evaluation function (corresponding to a color difference) $f_i$, a variable (corresponding to a masking parameter) x, and an evaluation function and a variable with 0 are used as an initial value (starting point). Only values approximate to the following equation (105) are calculated.

$$f_i = f_{i0} + \Sigma a_{ij}(x_j - x_{j0}) \quad (105)$$

$$a_{ij} = f_i/x_j = \Delta f_{ij}/\Delta x_j$$

However, $$\Delta f_{ij} = f_i(x_{10}, \ldots x_{j-10}, x_{j0}+\Delta x_j, x_{j+10}, \ldots x_{n0}), \text{ and}$$

$$f_{i0}x_j = x_j - x_{j0}$$

where, unlike the description of the optimization method shown in FIG. 6, "n" represents 12 masking parameters.

The variable x, that is, masking parameters, is selected in the same manner as in FIG. 6, and the explanation of determining the masking parameters is omitted.

In step S116, the thus-obtained 12 parameters are set in the color calculator 101. When the YMCBk signals are input to the color calculator 101, these signals are color-processed in accordance with the set parameters to output the R'G'B' signals.

As has been described above, this embodiment provides means for inputting color characteristics of a printer, and means for determining color/space converting parameters on the basis of these characteristics. It is therefore possible to convert YMCBk signals used for one printer to RGB signals used for another printer without deteriorating color reproducibility.

In the above-described embodiment of this invention, the four color signals, yellow (Y), magenta (M), cyan (C) and black (B), are input. However, three color signals, yellow, magenta and cyan, may also be input, depending upon the printer. In such a case, combinations of the YMC signals and their chromaticity values are used as the characteristics of an input printer. The color calculator 101 perform 3×3 calculation, thus producing 9 parameters.

In FIG. 2, the YMCBk signals are combined at 3 levels, totaling 81 types. In addition, these signals may be combined at, for example, 4 levels, thus totaling 256 types; 5 levels, thus totaling 625 types; or more levels. Signal values are not necessarily set at regular intervals.

In FIG. 2, the signal values are determined by including 0 and 255, however, these values may also be determined by interpolation, such as extrapolation, without including 0 or 255.

In FIG. 2, each of the YMCBk signals is composed of 8 bits, it may also be composed of a different number of bits. Although L*, a* and b* are used as chromaticity values in FIG. 2, other values, such as x, y and Y; L*, u* and v*; or u, v and Y, may also be used as chromaticity values.

Parameters used for the color calculator 101 shown in FIG. 11 can be changed. The color calculator 101 may perform any color processes as long as the values of output color signals can be varied by changing the parameters. Thus, the color calculator 101 may perform a process using a nonlinear term, a high-order calculation (in which, for instance, a combination of Y, M, C, Bk, YM, MC, and other signals is input and Y', M' and C' signals are output) except for 4×4 masking, or it may perform a process in which these processes and direct mapping are combined.

In the above embodiment, the difference between the maximum and minimum densities, D, obtained by the density/luminance convertor 102 may be used as a parameter for optimization.

In the above-described embodiment, it is not necessary to provide the primary convertor 103, depending upon the values of the RGB signals. For example, when the RGB signals conforming to NTSC are compatible with the color characteristics of a printer, a single evaluation scale φ decreases, even if the primary convertor 103 is not provided.

In the embodiment described above, it is possible to output excitation values, such as X, Y and Z instead of luminance signals, such as red, green and blue.

In the above embodiment, the initial values of parameters used for printers are stored beforehand in the ROM 106. These values are loaded from the ROM 106 into the color calculator 101 shown in FIG. 11 when the user selects the type of printer, and therefore the user is not required to input the characteristics of the printers.

Also, in the above-described embodiment, data stored in the RAM 105 and parameters calculated by the CPU 106 shown in FIG. 11 may be backed up. In the above embodiment, when the parameters of equation (101) are determined, the maximum value of K from among Y, M, C, and K to be input is expressed as $K_0$. When $K=K_0$, $Y=Y_0$, $M=M_0$ and $C=C_0$, the parameters $m_{11}$ to $m_{34}$ may be determined so as to satisfy the following equation (113), in addition to the conditions mentioned above.

$$255 = m_{11}Y_0 + m_{12}M_0 + m_{13}C_0 + m_{14}K_0$$
$$255 = m_{21}Y_0 + m_{22}M_0 + m_{23}C_0 + m_{24}K_0 \quad (113)$$
$$255 = m_{31}Y_0 + m_{32}M_0 + m_{33}C_0 + m_{34}K_0$$

(Y', M', C', Y, M, C and K are each composed of 8-bit data.)

The reason for such determination will be given. The point where the maximum value of K is $K_0$ is regarded as the darkest portion of an image, that is, a black character or the like. When the color data of such a point is expressed by luminance components, R, G and B, then R=0, G=0 and B=0. When R=0, G=0 and B=0 are expressed by complementary color components, Y', M' and C', then Y'=255, M'=255 and C'=255. Therefore, the parameters $m_{11}$ to $m_{34}$ may be determined so as to satisfy equation (113).

By determining the parameters $m_{11}$ to $m_{34}$ so as to satisfy equation (113), the black character portion of a high image quality can be displayed on, for example, a CRT operated on the basis of RGB data because Y'=255, M'=255 and C'=255, that is, R=0, G=0 and B=0. The above modifications can be made in the same way as in the embodiment shown in FIG. 1.

A further embodiment will now be described.

In this embodiment, a function is provided as part of the CPU 106 shown in FIG. 11, which function is capable of performing a high-speed calculation, such as a Reduced Instruction Set Computer (RISC), to convert YMCBk signals into RGB luminance signals. The YMCBk signals are thus converted into the RGB signals for each image data item. In this embodiment, except for a CPU 111, the circuitry of an image processing apparatus is the same as that of the image processing apparatus shown in FIG. 11. The same circuits as those shown in FIG. 11 are identified by the same numerals, and the explanation thereof is omitted.

Figure 15:
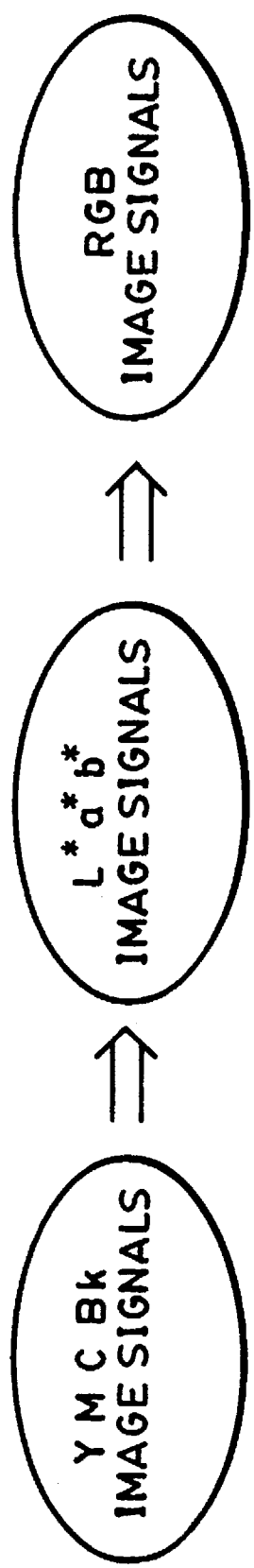
FIG. 15 is a view showing the concept of processing an image in accordance with a sixth embodiment of the invention.
Figure 16:
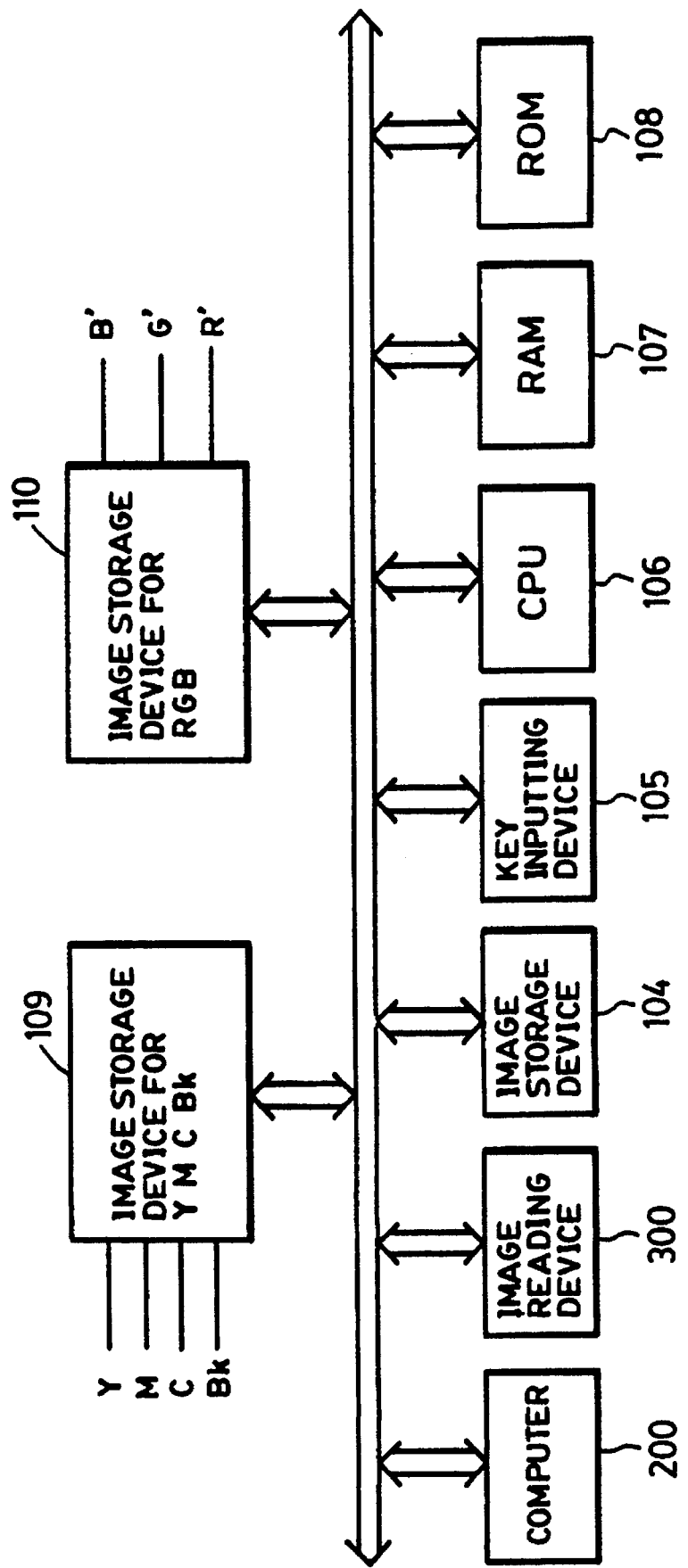
FIG. 16 is a block diagram showing a color image processing apparatus of the sixth embodiment illustrated in FIG. 15.

FIG. 15 is a view showing the concept of processing an image in accordance with this embodiment. FIG. 16 is a block diagram showing a color image processing apparatus of this embodiment. In FIG. 16, numeral 109 denotes an image storage device for inputting and storing the YMCBk signals; 110, an image storage device for storing the RGB signals; and 106, the CPU.

In the same manner as in the first embodiment, the relationship between the YMCBk signals and chromaticity values is determined beforehand and saved in a RAM 107.

Figure 17:
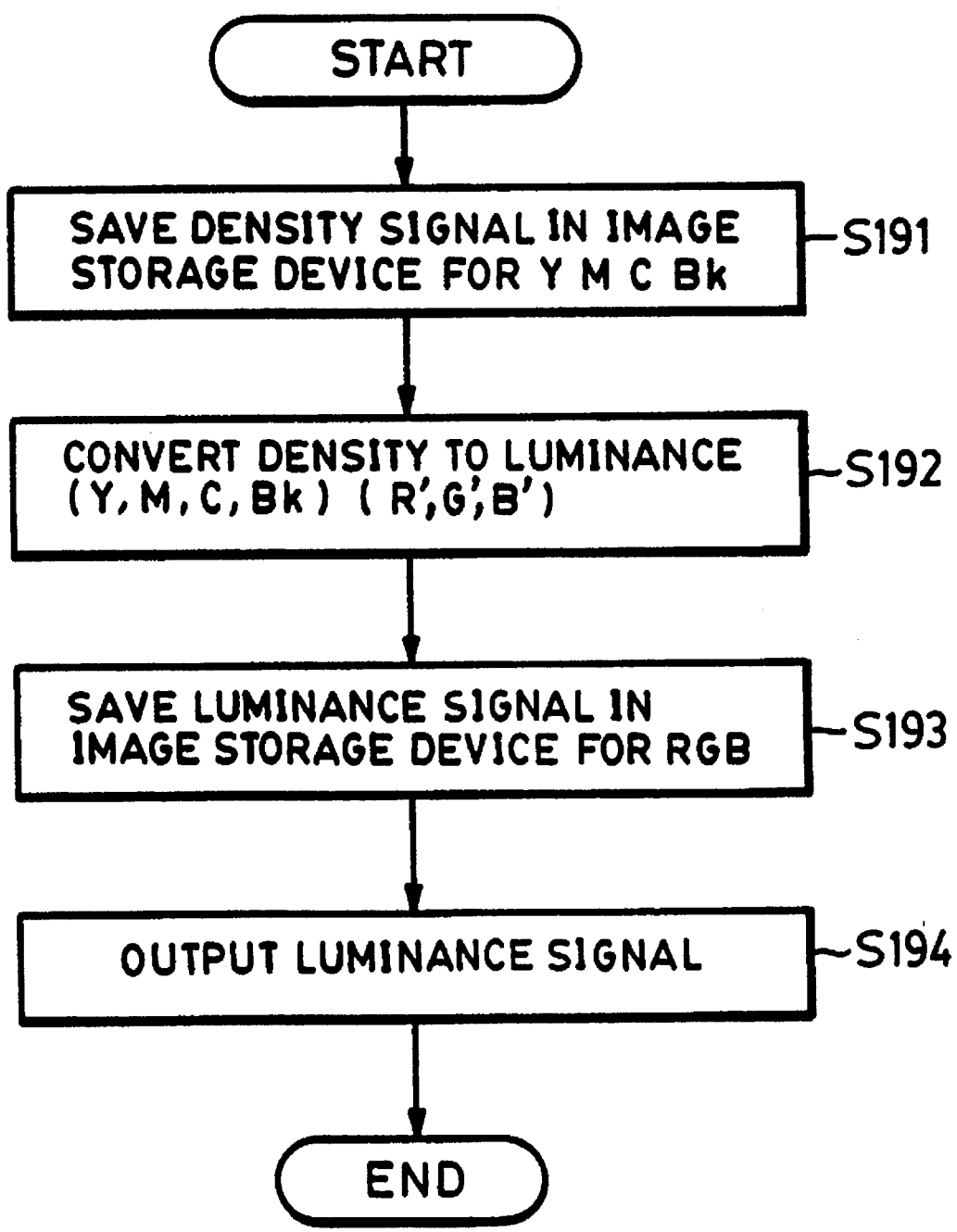
FIG. 17 is a flowchart illustrating the operation of a CPU used in the sixth embodiment shown in FIG. 15.

FIG. 17 is a flowchart illustrating the operation of the CPU 111.

In step S191, the YMCBk signals are input and then saved in the image storage device 109. In step S192, the CPU 111 reads the YMCBk signals from the image storage device 109, and then converts them into R', G' and B' luminance signals for each pixel. In step S193, the R'G'B' luminance signals are saved in the image storage device 110. In step S194, these signals saved in the image storage device 110 are output.

If a combination of the YMCBk signals, which is saved in the image storage device 109 and is not listed in a table, is input in seep S191, then chromaticity values L*, a* and b* corresponding to the YMCBk signals are determined by interpolation. Linear interpolation and other types of interpolation may be employed. The YMCBk signals are converted into RGB signals, such as RGB signals conforming to NTSC) based on the chromaticity values. This conversion is carried out as the following equation (111):

$$X = X0 * \{L*+16)/116+a*/500\}^3$$
$$Y = Y0 * \{L*+16)/116\}^3 \quad (111)$$
$$Z = Z0 * \{L*+16)/116-b*/500\}^3$$

However, since the observation light sources of X0, Y0 and Z0 are C light sources, these values become 98.04, 100 and 118.11. The maximum value of the RGB luminance signals is a value when white paper is read. The excitation values X, Y and Z are converted into X', Y' and Z'. The RGB signals are determined by the following equation (112):

$$\begin{bmatrix} R' \\ G' \\ B' \end{bmatrix} = \begin{bmatrix} 1.9107 & -0.5328 & -0.2882 \\ -0.9843 & 1.9986 & -0.0284 \\ 0.0584 & -0.1185 & 0.8985 \end{bmatrix} \begin{bmatrix} X' \\ Y' \\ Z' \end{bmatrix} \quad (112)$$

Thus, according to this embodiment, the YMCBk signals can be converted into the RGB signals because the CPU 106 performs only a predetermined calculation. Data converted into the RGB signals may be output to a monitor or input to a color printer which prints the data after the RGB signals have been converted into the YMCBk signals.

The present invention may be applied not only to a system composed of a plurality of devices but also to a system composed of one device. Needless to say, it may also be applied by supplying programs of the invention to a system or a device.

As has been described above, this invention makes it possible to convert YMCBk or YMC signals used for a certain printer into RGB signals without deteriorating color reproducibility.

What is claimed is:

1. An apparatus for processing a color image, comprising:
   means for inputting density signals corresponding to colors;
   means for color-calculating the density signals in accordance with their characterics; and
   means for converting the density signals into luminance component signals or excitation values of a plurality of colors, this conversion being based upon the results of a color calculation performed by said color-calculating means,
   wherein said characteristics are color characteristics of a recording device, by which device the density signals are output after these signals have been input by said inputting means.

2. An apparatus according to claim 1, wherein said inputting means inputs a combination of the colors of the density signals and a chromaticity value corresponding to the combination; said color-calculating means performs the color calculation in accordance with the combination and the chromaticity value; and said converting means sets parameters for performing conversion in accordance with the density signals.

3. An apparatus according to claim 1, wherein said inputting means inputs a combination of the colors of the density signals and a first chromaticity value corresponding to the combination; said color-calculating means interpolates the density signals in accordance with the combination and the first chromaticity value so as to determine a second chromaticity value; and said converting means determines the luminance signals or the excitation values in accordance with the second chromaticity value.

4. An apparatus according to claim 1, wherein the density signals corresponding to the colors are yellow, magenta, cyan and black signals.

5. An apparatus according to claim 1, wherein the luminance component signals of the plurality of colors are red, green and blue signals.

6. A method of processing an color image, comprising the steps of:
   inputting density signals corresponding to colors;
   color-calculating the density signals in accordance with their characteristics; and
   converting the density signals into luminance component signals or excitation values of a plurality of colors, this conversion being based upon the results of a color calculation,
   wherein said characteristics are color characteristics of a recording device, by which device the density signals are output after these signals have been input by said inputting step.

7. A color image processing apparatus where a color correction parameter is used in color correction means for a subject output device such that an output image of said subject output device is matched with an output image of a standard output device, comprising:
   storage means for storing first data representing the characteristics of said standard output device and second data representing the characteristics of said subject output device;
   calculating means for calculating said color correction parameter based on said first and second data; and
   setting means for setting said color correction parameter into said color correction means.

8. A color image processing apparatus according to claim 7, wherein said first and second data is obtained by measuring a color of a color patch formed by said output devices.

9. A color image processing apparatus according to claim 8, wherein said first and second data is a plurality of combinations of a density value and a chromaticity value indicating a predetermined color patch.

10. A color image processing apparatus according to claim 9, wherein said density value is composed of four color components, yellow (Y), magenta (M), cyan (C) and black (K).

11. A color image processing apparatus according to claim 9, wherein said chromaticity value is composed of the components, L*, a* and b*.

12. A color image processing apparatus according to claim 7 further comprising image forming means for forming an image by said subject output device.

13. A color image processing apparatus according to claim 12, wherein said image forming means is an electrophotographic printer.

14. A color image processing apparatus according to claim 12, wherein said image forming means is an ink-jet printer.

15. A color image processing apparatus according to claim 7, wherein said calculating means calculates said color correction parameter based on a limiting value of color mixture.

16. A color image processing apparatus according to claim 7, wherein said calculating means calculates said color correction parameter by an optimization method based on said first and second data.

17. A method of processing a color image comprising the steps of:

inputting image data;

correcting the input image data based on a color correction parameter;

outputting the color-corrected image data composed of a plurality of components to an output device; and setting the color correction parameter;

wherein, in the setting step, the color correction parameter is set to a value such that a sum of the components of the color-corrected image data is less than or equal to a predetermined value based on the characteristics of said output device.

18. A method of processing a color image according to claim 17, wherein the components composing the input image data include yellow, magenta, cyan and black.

19. A method of processing a color image according to claim 17, wherein in the outputting step the color-corrected image data is output to a printer.

20. A method of processing a color image according to claim 19, wherein said printer is an electrophotographic printer.

21. A method of processing a color image according to claim 19, wherein said printer is an ink-jet printer.

22. A method of processing a color image according to claim 17, wherein said predetermined value is a limiting value of color mixture.

23. A method of processing a color image according to claim 17, wherein, in the setting step, a color correction parameter is calculated based on color data obtained by measuring a color of a formed color patch.

24. A method of processing a color image according to claim 17, wherein, in the setting step, the color correction is automatically set.

25. A color image processing method where a color correction parameter is used for color correction for a subject output device such that an output image of said subject output device is matched with an output image of a standard output device, comprising:

a storage step for storing first data representing the characteristics of said standard output device and second data representing the characteristics of said subject output device;

a calculating step for calculating said color correction parameter based on said first and second data; and a setting step for setting said color correction parameter for the color correction.

26. A color image processing apparatus comprising:

input means for inputting first density data, that depends on an output device, composed of a plurality of color components including a black color component;

matrix calculating means for executing a matrix calculation of the density data by using a matrix coefficient based on color characteristics of said output device and for outputting second density data composed of a plurality of color components including no black color component;

converting means for performing a density/luminance conversion of the second density data;

primary converting means for performing a primary conversion of luminance data; and output means for outputting the primary converted luminance data on a display unit.

27. A color image processing apparatus according to claim 26, wherein the first density color image data is composed of yellow, magenta, cyan and black color components.

28. A color image processing apparatus according to claim 26, wherein the luminance data is composed of red, green, and blue color components.

29. A color image processing method comprising the steps of:

calculating conversion data based on a first color reproduced from predetermined density data by a standard output device and a second color reproduced from the predetermined density data by a subject output device;

setting the conversion data in accordance with a combination of the standard output device and the subject output device;

converting density data composed of a plurality of color components including a black color component, that depends on said standard output device, to luminance data based on the conversion data; and outputting the luminance data on said subject output device.

30. A color image processing method according to claim 29, wherein said subject output device is a display device.

31. A color image processing method according to claim 29, wherein said standard output device is a printer.

32. A color image processing method according to claim 29, wherein the first color reproduced from predetermined density data is composed of yellow, magenta, cyan and black color components.

33. A color image processing method according to claim 29, wherein the luminance data is composed of red, green and blue color components.

* * * * *

UNITED STATES PATENT AND TRADEMARK OFFICE
CERTIFICATE OF CORRECTION

PATENT NO.  : 5,608,549
DATED       : March 4, 1997
INVENTOR(S) : AKIHIRO USAMI

It is certified that error appears in the above-identified patent and that said Letters Patent is hereby corrected as shown below:

<u>COLUMN 9</u>

Line 29, "perform" should read --performs--.

<u>COLUMN 12</u>

Line 18, "an" should read --a--.

Signed and Sealed this

Sixteenth Day of September, 1997

Attest:

BRUCE LEHMAN

*Attesting Officer*         Commissioner of Patents and Trademarks